United States Patent
Feng et al.

(10) Patent No.: US 11,652,674 B2
(45) Date of Patent: May 16, 2023

(54) PREPARING A SYMBOL FOR TRANSMISSION

(71) Applicant: Telefonaktiebolaget LM Ericsson (publ), Stockholm (SE)

(72) Inventors: Ang Feng, Stockholm (SE); Tao Huang, Beijing (CN); Jinlai He, Beijing (CN); Nan Wang, Beijing (CN); Dong Wang, Beijing (CN); Guozhu Li, Beijing (CN)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 36 days.

(21) Appl. No.: 17/414,642

(22) PCT Filed: Dec. 21, 2018

(86) PCT No.: PCT/CN2018/122566
§ 371 (c)(1),
(2) Date: Jun. 16, 2021

(87) PCT Pub. No.: WO2020/124526
PCT Pub. Date: Jun. 25, 2020

(65) Prior Publication Data
US 2022/0052892 A1   Feb. 17, 2022

(51) Int. Cl.
*H04L 25/03* (2006.01)
*H04L 27/26* (2006.01)

(52) U.S. Cl.
CPC .... *H04L 25/03343* (2013.01); *H04L 27/2607* (2013.01); *H04L 27/26025* (2021.01); *H04L 27/2626* (2013.01)

(58) Field of Classification Search
CPC ......... H04L 25/03343; H04L 27/26025; H04L 27/2607; H04L 27/2626; H04L 2025/03414; H04L 25/03159
See application file for complete search history.

(56) References Cited

U.S. PATENT DOCUMENTS

2008/0117872 A1* 5/2008 Kim ................ H04L 25/03834
370/329
2009/0161804 A1   6/2009 Chrabieh et al.
(Continued)

FOREIGN PATENT DOCUMENTS

WO   2017076446 A1   5/2017
WO   2017119637 A1   7/2017

OTHER PUBLICATIONS

3GPP, "3rd Generation Partnership Project; Technical Specification Group Radio Access Network; NR; Physical channels and modulation (Release 15)", 3GPP TS 38.211 V15.2.0, Jun. 2018, 1-96.
(Continued)

*Primary Examiner* — Sung S Ahn
(74) *Attorney, Agent, or Firm* — Christopher & Weisberg, P.A.

(57) ABSTRACT

In one example aspect, a method is provided of preparing a symbol for transmission, the method comprising applying a window function to a symbol to generate a modified symbol, wherein a property of the window function is based on a channel length of a transmission channel over which the modified symbol is to be transmitted, and causing the modified symbol to be transmitted over the transmission channel.

19 Claims, 9 Drawing Sheets

Applying a window function to a symbol to generate a modified symbol, wherein a property of the window function is based on a channel length of a transmission channel over which the modified symbol is to be transmitted — 102

Causing the modified symbol to be transmitted over the transmission channel — 104

100

(56) References Cited

U.S. PATENT DOCUMENTS

| | | | |
|---|---|---|---|
| 2010/0157833 A1 | 6/2010 | Vrcelj et al. | |
| 2015/0333944 A1 | 11/2015 | Bae et al. | |
| 2016/0197758 A1 | 7/2016 | Lin et al. | |
| 2018/0198649 A1 | 7/2018 | Lindoff et al. | |
| 2019/0029026 A1* | 1/2019 | Yun | H04J 11/003 |
| 2019/0222456 A1* | 7/2019 | Zeng | H04L 27/20 |

OTHER PUBLICATIONS

3GPP, "3rd Generation Partnership Project; Technical Specification Group Radio Access Network; NR; Physical channels and modulation (Release 15)", 3GPP TS 38.211 V15.3.0, Sep. 2018, 1-96.

3GPP, "3rd Generation Partnership Project; Technical Specification Group Radio Access Network; Study on Scenarios and Requirements for Next Generation Access Technologies; (Release 15) 3GPP TR 38.913 V15.0.0", 3GPP TR 38.913 V15.0.0, Jun. 2018, 1-39.

Intel Corporation, "Remaining Details of SS", 3GPP TSG RAN WG1 Meeting 2018 Ad-hoc #1, R1-1800296, Vancouver, Canada, Jan. 22-26, 2018, 1-4.

Zaidi, Ali A., et al., "Waveform and Numerology to Support 5G Services and Requirements", IEEE Communications Magazine, vol. 54, Issue 11,, Nov. 2016, 1-9.

EPO Communication and Supplementary Search Report dated Dec. 10, 2021 for Patent Application No. 18943432.7, consisting of 8-pages.

* cited by examiner

PREPARING A SYMBOL FOR TRANSMISSION

TECHNICAL FIELD

Examples of the present disclosure relate to preparing a symbol for transmission, for example by applying a window function to the symbol.

BACKGROUND

A challenge of a wireless communications system such as the 5G communications system (also referred to as New Radio, NR) is how to fulfil a wide variety of requirements within a single architecture. In 5G, for example, Orthogonal Frequency Division Multiplexing (OFDM) may be used. Although some candidate waveforms may have superior performance against OFDM in some aspects, OFDM may give the best balance of performance across diverse use cases, as shown for example by A. A. Zaidi et al., "Waveform and Numerology to Support 5G Services and Requirements," IEEE Communications Magazine, vol. 54, no. 11, pp. 90-98, November 2016. NR numerology may describe OFDM subcarrier spacing (SCS) and the length of the cyclic prefix (CP) used for each symbol, see for example $3^{rd}$ Generation Partnership Project (3GPP) technical specification (TS) 38.211 V15.3.0 (2018-09). SCS determines the length of one OFDM symbol, and may be chosen according to coherent time and coherent frequency. CP may be a copy of the tail of OFDM symbol, to reduce or avoid inter-symbol interference (ISI) and to convert linear convolution to cyclic convolution. With the aid of the CP, the transmission channel for OFDM symbols can in some examples be equalized with single-tap frequency domain equalization. Therefore, the complexity of receiver may be significantly decreased. The length of the CP should be chosen in consideration of the worst case of all possible wireless propagation channels. For example, the length of the CP should be chosen to take account of at least the longest expected channel length for the transmission channel.

SUMMARY

Embodiments disclosed seek to address at least the problem with existing solutions for NR waveform and numerology selection being overly constrained by applying a limited fixed number of cyclic prefix lengths to ensure inter-symbol interference is reduced or avoided. Such constraints may result in reduced performance and increased energy consumption depending on the channel conditions and service/use case to be provided.

Embodiments are provided for preparing a symbol for transmission, for example by applying a window function to the symbol, wherein a property of the window function is based on channel length. An advantage of such embodiments is that the transmission numerology is more dynamic and adaptive to the immediate CSIT which in turn can reduce ISI and energy consumption.

One aspect of the present disclosure provides a method of preparing a symbol for transmission. The method comprises applying a window function to a symbol to generate a modified symbol, wherein a property of the window function is based on a channel length of a transmission channel over which the modified symbol is to be transmitted. The method also comprises causing the modified symbol to be transmitted over the transmission channel.

Another aspect of the present disclosure provides apparatus for preparing a symbol for transmission. The apparatus comprises a processor and a memory. The memory contains instructions executable by the processor such that the apparatus is operable to apply a window function to a symbol to generate a modified symbol, wherein a property of the window function is based on a channel length of a transmission channel over which the modified symbol is to be transmitted, and cause the modified symbol to be transmitted over the transmission channel.

A further aspect of the present disclosure provides apparatus for preparing a symbol for transmission. The apparatus is configured to apply a window function to a symbol to generate a modified symbol, wherein a property of the window function is based on a channel length of a transmission channel over which the modified symbol is to be transmitted, and cause the modified symbol to be transmitted over the transmission channel.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analogue and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

The waveform and numerology (e.g. subcarrier spacing, symbol length and CP length) used by 5G/NR may support a wide range of frequencies, bandwidths, and deployment options, for example to support diverse use cases such as eMBB, URLLC, and mMTC. A radio frame is divided into 20 slots, and a normal slot contains 14 OFDM symbols, and a mini-slot contains 2, 3 or 7 OFDM symbols. The first OFDM symbol per slot may have a longer CP. Although five different numerologies with different CP lengths have been suggested in the NR specification, these do not accommodate all scenarios. Instead, the length of CP in each NR numerology may be longer than is required or useful. Thus, the CP may include redundancy that does not contribute to improved performance, and instead may consume more transmitted energy, compared to a shorter CP length. However, embodiments disclosed herein are not restricted to a particular numerology or set of numerologies, or a particular property such as CP length, symbol length, subcarrier spacing or slot arrangement.

Figure 1:
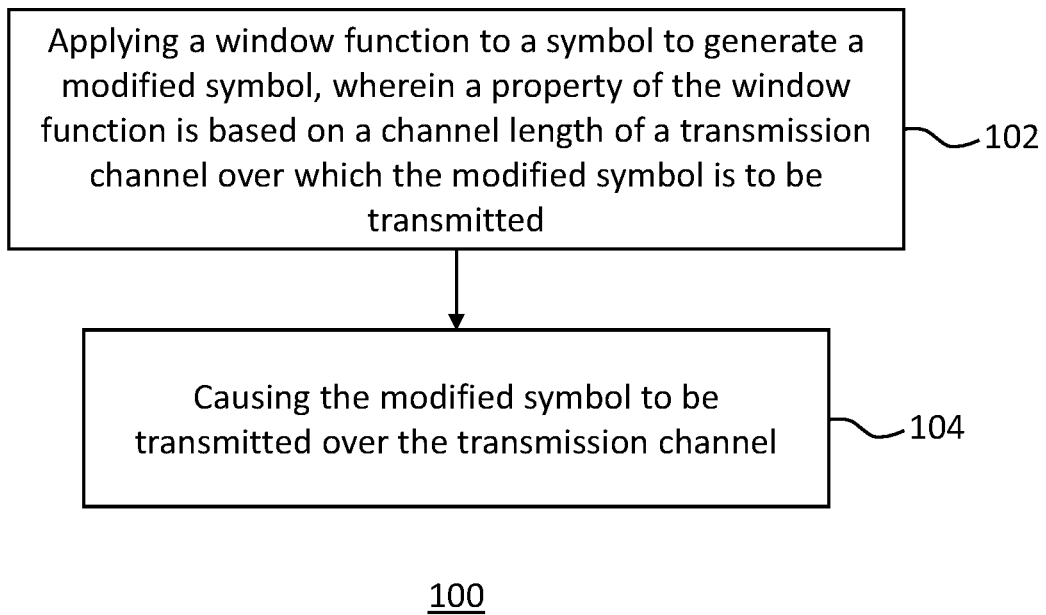
FIG. 1 is a flow chart of an example of a method of preparing a symbol for transmission.

FIG. 1 is a flow chart of an example of a method 100 of preparing a symbol for transmission. The method 100 may be implemented in some examples by a node in a network, such as for example a base station or User Equipment (UE). The symbol may be an OFDM symbol in some examples, and/or may include a cyclic prefix (CP). The symbol may be a symbol in a stream of symbols to be transmitted, such that there may be one or more preceding symbols and/or one or more subsequent symbols to be transmitted.

The method comprises, in step 102, applying a window function to a symbol to generate a modified symbol, wherein a property of the window function is based on a channel length of a transmission channel over which the modified symbol is to be transmitted. The channel length may comprise for example the time difference between a first arriving symbol and a last copy of the symbol in a multipath transmission channel. A multipath channel may cause a transmitted symbol to overlap with a preceding symbol and/or a subsequent symbol at the receiver, and hence cause inter-symbol interference (ISI). In some examples, the property of the window function may be selected to reduce ISI at the receiver, taking into account the channel length. For example, an amount of interference between the modified symbol and a preceding modified symbol and/or a subsequent modified symbol may be based on the property of the window function in some examples. For example, the window function may have a bandwidth and/or roll-off rate (e.g. in the frequency domain) based on the channel length. Where there is a shorter channel length, for example, the CP of a transmitted may be longer than needed. Hence, the bandwidth may be smaller and/or the roll-off rate greater to further supress ISI of the transmitted symbol with a preceding symbol and/or subsequent symbol as seen at the receiver. In some examples, the bandwidth may be defined as the width of main lobe (in the frequency domain) at gain of half maximum value. In some examples, the roll-off rate may be defined as the asymptotic decay rate of side lobe peaks.

In some examples, the window function may effectively zero or reduce the magnitude of a cyclic prefix for the symbol, such as for example a first portion of the cyclic prefix. The amount of reduced or zeroed portion of the cyclic prefix may be based on the channel length. For example, the length of part of the CP that is unmodified or substantially unmodified by the window function may be equal to (or greater than) the channel length, and the remaining portion of the CP may be the reduced or zeroed portion. By reducing or zeroing the portion of the CP in this way, in some examples, ISI may be reduced between transmitted symbols.

The method 100 also comprises, in step 104, causing the modified symbol to be transmitted over the transmission channel. For example, this may comprise transmitting the symbol or instructing a transmitter to transmit the symbol.

In some examples, applying the window function to the symbol comprises applying a window function based on a truncating window function. A truncating window function may comprise for example a Hanning, Blackman or Kaiser window function. The truncating window function may have the effect of adjusting the property, such as bandwidth and/or roll-off rate, of the window function and hence the ISI seen by a receiver between the transmitted (modified) symbol and a preceding and/or subsequent symbol. The bandwidth or roll-off rate of the truncating window function may be based on the channel length and/or a bandwidth of the transmission channel.

In some examples, the window function comprises a rectangular or sinc function combined with a truncating window function. For example, the rectangular (in the time domain) function or sinc (in the frequency domain) function may be combined with the truncating window function, such as for example by multiplication in the frequency domain. The rectangular function in the time domain may comprise a function that is 1 within a rectangular window and 0 outside of the window. The size of the rectangular function or a bandwidth of the sinc function is based on the channel length.

In some examples, causing the modified symbol to be transmitted comprises applying filtering to the modified symbol based on a channel response of the transmission channel to form a filtered symbol, and causing the filtered symbol to be transmitted. Thus filtering (e.g. precoding) may also be applied to the symbol before it is transmitted. The filtering or precoding may in some examples be based on channel state information (e.g. in the case of a time-division duplex, TDD, channel with channel reciprocity), such as for example applying a ripple compensation or pre-equalization of the modified symbol in the transmitter side to mitigate ISI in the receiver side.

In some examples, the channel length is determined, for example by the entity performing the method 100. The channel length may be determined based on a signal from a node to which the modified symbol is to be transmitted. For example, the signal may be a pilot signal or other signal transmitted by the node. Alternatively, the channel length may be indicated by information in the signal, such information being determined by the node based on signals received at the node. In some examples, the node comprises a base station or User Equipment (UE).

In some examples, the method comprises overlapping the modified symbol with a preceding modified symbol and/or a subsequent modified symbol. For example, where the window function spreads the symbol in time (e.g. the modified symbol has a greater duration than the unmodified symbol), the modified symbol may be combined (e.g. added) to a preceding symbol and/or a subsequent symbol. The preceding and/or subsequent symbol(s) may in some examples also be modified in a similar manner, i.e. by the window function (though in some examples, the channel length and hence the property of the window function may vary between symbols). For example, the method 100 may comprise applying a preceding window function to a preceding symbol to generate the preceding modified symbol, wherein a property of the preceding window function is based on a channel length of a transmission channel over which the preceding modified symbol is to be transmitted. Additionally or alternatively, the method 100 may comprise applying a subsequent window function to a subsequent symbol to generate the subsequent modified symbol, wherein a property of the subsequent window function is based on a channel length of a transmission channel over which the subsequent modified symbol is to be transmitted.

Figure 2:
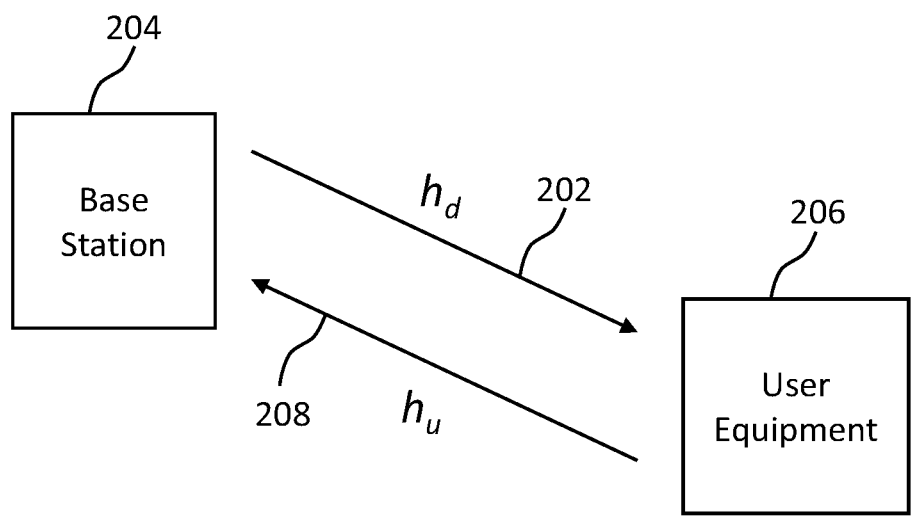
FIG. 2 is a schematic of an example of a communication system.

In some examples of communication systems, such as for example NR/5G, TDD may be preferred over FDD due to channel reciprocity. Thus in some examples of the present disclosure, TDD may be employee between two nodes of a communication system, such as for example between a base station and a UE. In some examples, channel state information at the transmitter (CSIT) may be employed to perform precoding. FIG. 2 is a schematic of an example of a communication system 200 that uses TDD with channel reciprocity, where CSIT may for example be altered to channel state information at the receiver (CSIR). In the communication system 200 of FIG. 2, the channel response of a downlink wireless channel 202 from a base station 204 to a UE 206 is represented by $h_d$, whereas the channel response of the uplink channel 208 is represented by $h_u$. In some examples, perfect channel reciprocity provides $h_d h_u^* = 1$. In some examples of the present disclosure, a flexible windowing solution is proposed, in which a fixed length CP for a symbol is updated to an effectively variable length CP (e.g. the property, such as bandwidth and/or roll off rate in the frequency domain, of the window is based on channel length). Part of CP may be replaced with zero padding (ZP) to facilitate windowing. The ZP between two adjacent symbols may be overlapped in some examples. The proposed windowing may in some examples introduce symbol extension (e.g. an increase in symbol length) due to an additional part at each end of the transmitted symbol due to application of the window.

In an example, assuming a CP length of $N_{CP}$, the length of the ZP may be defined as $N_{SUP} = \mu N_{CP}$, where $0 < \mu < 1$. In some examples, p may be a factor based on the channel length and/or may be determined based on CSIT. In some examples, on-the-fly capability is provided, where the window parameter is decided from p and may be updated between transmitted symbols, for example based on recent or updated CSIT.

In some examples, a filter such as a FIR filter may also be applied to the modified symbol (the symbol that is modified by the window function), for example as pre-equalization or ripple compensation. To avoid interference between windowing and precoding, additional ZP may be introduced in some examples.

Specific example embodiments will now be described. Assuming a channel length of $N_{channel}$, a minimum CP length can be determined based on $(1-\mu)N_{CP} \geq N_{channel}$.

Replacing part of CP (length of $\mu N_{CP}$) with ZP may still avoid ISI and setup cyclic convolution. Accordingly, in some examples, $$\mu \leq 1 - \frac{N_{channel}}{N_{CP}}.$$

Figure 3:
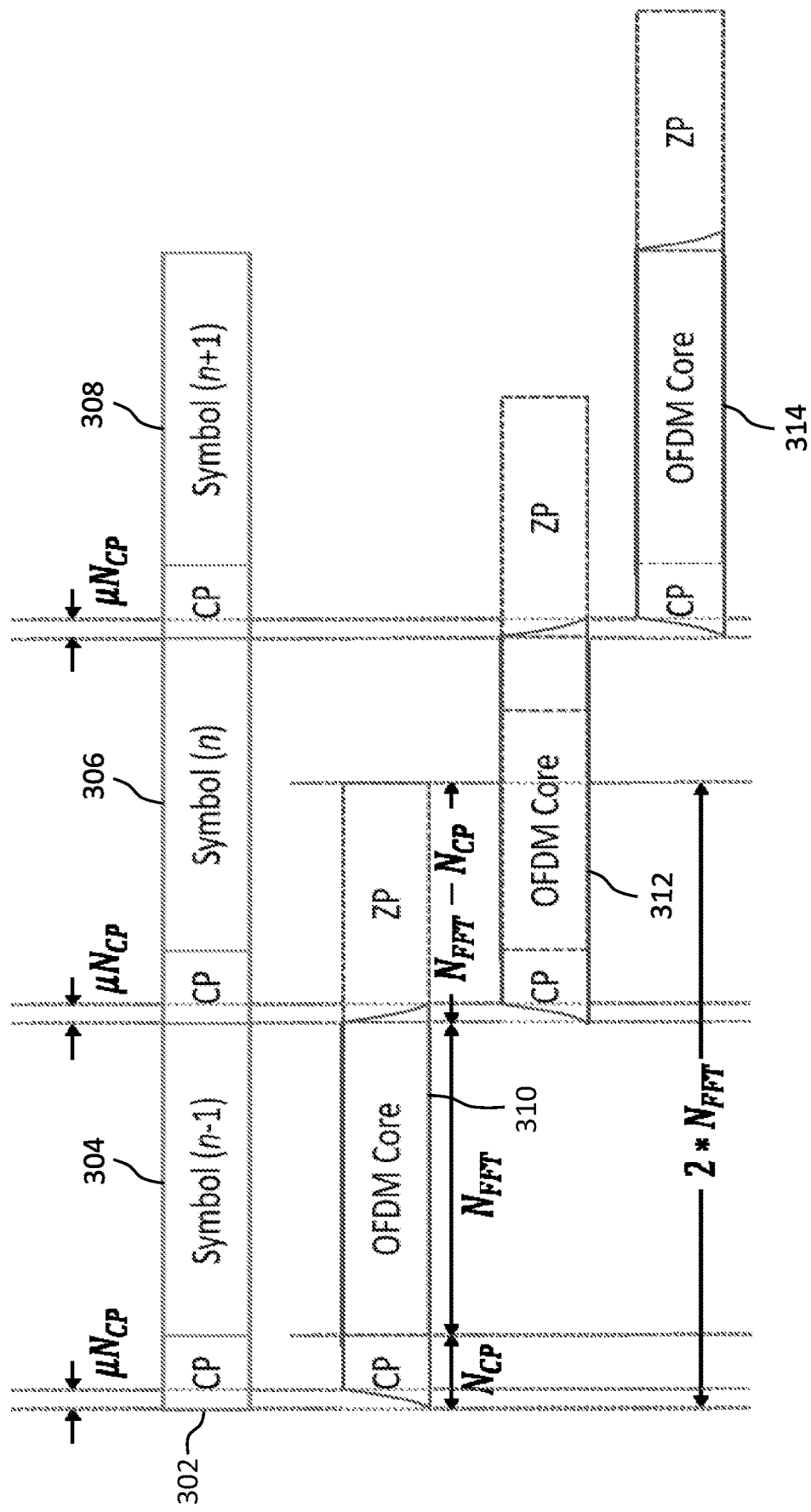
FIG. 3 illustrates modification of three successive symbols by the application of a window function.

FIG. 3 illustrates modification of three successive symbols (which may be for example OFDM symbols) by the application of a window function as disclosed herein. The x-axis represents time. A first row 302 shows symbols 304, 306 and 308 to be transmitted, comprising symbol (n−1), symbol n and symbol (n+1) respectively. The symbols each include a cyclic prefix (CP). A second row shows a modified first symbol 310 based on (unmodified) first symbol (n−1) 304. A third row shows modified second symbol 312. A third row shows modified third symbol 314.

FIG. 3 illustrates that the modified symbols include an overlap portion, which may be summed for the transmitted waveform. In an example, where the symbols 304, 306 and 308 are OFDM symbols, assuming a length of the OFDM core (e.g. non-CP part of OFDM symbol) of a symbol as $N_{FFT}$ and length of the CP for a symbol as $N_{CP}$, the length of the overlap part can be expressed as $N_{FFT}-N_{CP}$. If the channel length is shorter than $N_{CP}$, in some examples, part of the CP for a symbol may be replaced with ZP, denoted as $N_{SUP} = \mu N_{CP}$ in FIG. 3, where $0 < \mu < 1$. If the channel length is short, in some examples, $\mu$ may approach 1, whereas if the channel length is long, $\mu$ may approach 0. In some examples, $\mu$ can be updated between symbols (e.g. per slot, per symbol, per frame, and/or in any other interval). Two successive symbols may overlap in $N_{SUP}$, depending on the window parameter or property.

An example of a window function as disclosed herein may be referred to as a configurable truncated-sinc function. An example of a procedure to determine such a window function is described below.

1. Start with a rectangular window, with value $W_0 = 1$ from $-(1-\mu)N_{CP}$ to $N_{FFT}$ (and 0 otherwise in some examples);
2. Calculate $W_0 = FFT(w_0)$ with size $S*N_{FFT}$, where S denotes an oversample rate to compensate for missing points between FFT bins. This may provide a sinc function in the frequency domain in some examples. FFT refers to Fast Fourier Transform, whereas IFFT refers to Inverse Fast Fourier Transform.
3. Generate a truncating window T with function window ($N_{win}$), where the window function may in some examples comprise an existing window function such as Hanning, Blackman, Kaiser, or any other suitable (e.g. truncating) window function;
4. Determine $N_{win}$ according to $\mu$. For example, $N_{win} = M_f N_{CP}/\mu$, where $M_f$ denotes a modification factor. $M_f$ may in some examples be chosen according to the bandwidth of the transmission channel, and may in some examples be unrelated to the window function. In some examples, the modification factor is lower for a larger bandwidth transmission channel. In some examples, the value for $M_f$ is chosen according to the table below:

| Bandwidth (MHz) | 10 | 15 | 20 | 25 | 30 | 40 | 50 | 60 | 80 | 100 |
|---|---|---|---|---|---|---|---|---|---|---|
| $M_f$ | 1.5 | 1 | 0.75 | 0.75 | 0.375 | 0.375 | 0.375 | 0.1875 | 0.1875 | 0.1875 |

5. Multiply $W_0$ and T to generate Truncated-Sinc function $W_1(k)=T(k)*W_0(k)$, for k=

$$k = -\frac{S*N_{FFT}}{2}, -\frac{S*N_{FFT}}{2}+1, \ldots \frac{S*N_{FFT}}{2}-1, \frac{S*N_{FFT}}{2};$$

6. Calculate $w_1=\text{IFFT}(W_1)$, which can be used in some examples as a window function to be applied to a symbol in the time domain to generate a modified symbol.

Figure 4:
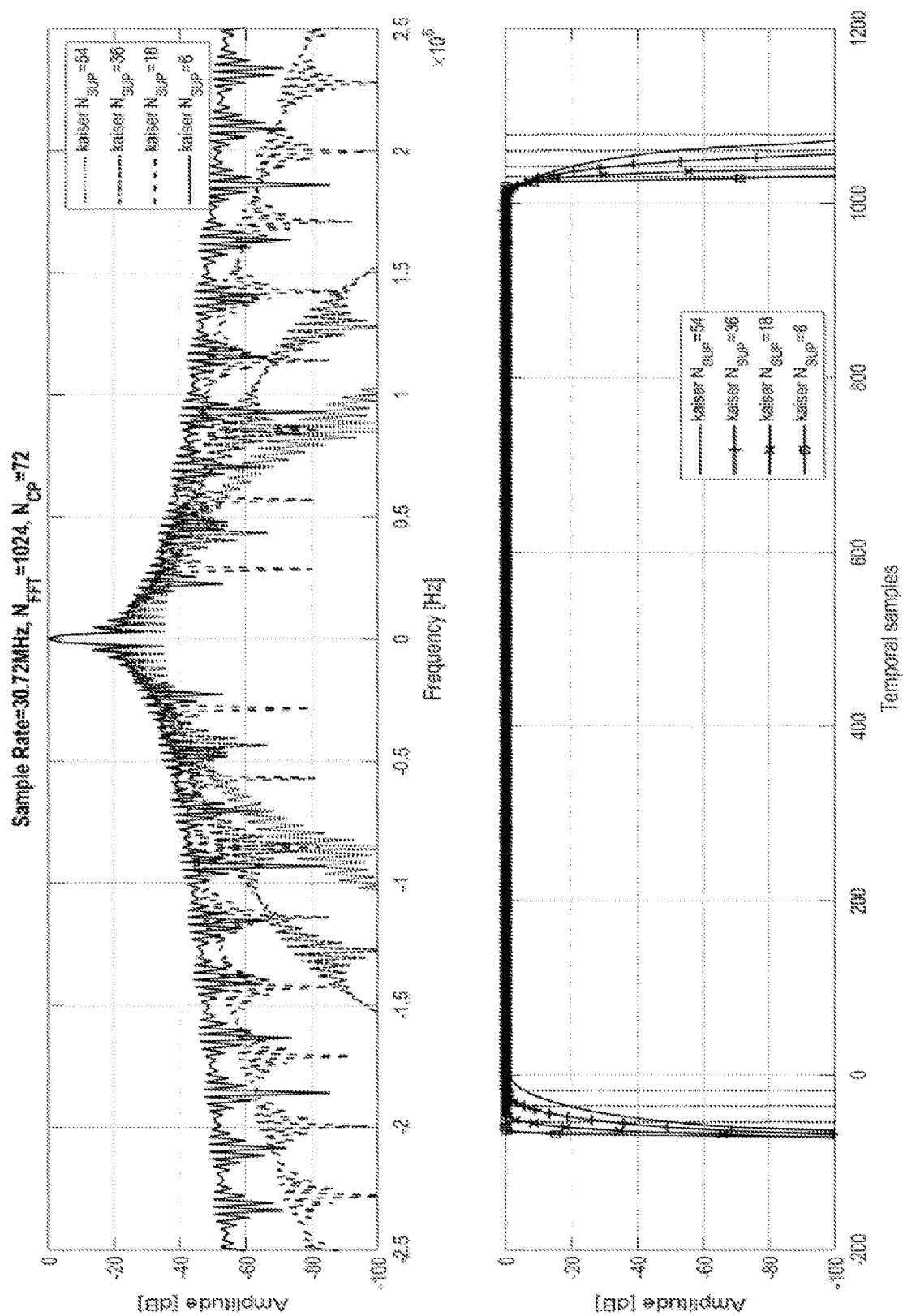
FIG. 4 shows examples of window functions in both the frequency and time domains based on using a Blackman window function.
Figure 5:
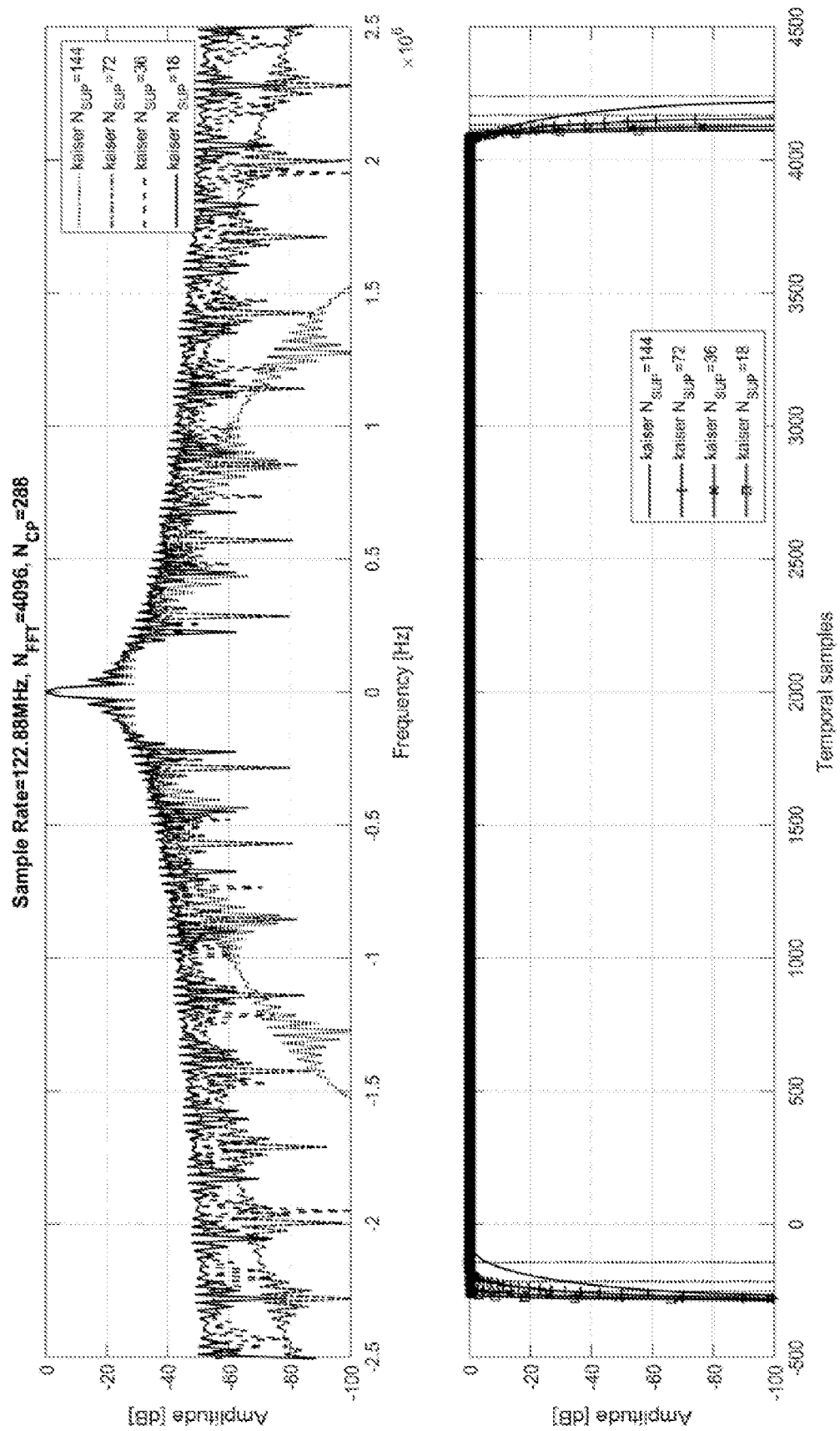
FIG. 5 shows examples of window functions in both the frequency and time domains based on using a Kaiser window function.

FIG. 4 shows examples of window functions (e.g. truncated sinc functions) in both the frequency and time domains that use a Kaiser window for a NR 20 MHz bandwidth signal, with various values for $N_{SUP}$. $N_{SUP}$ is based on values of $\mu=3/4, 1/2, 1/4, 1/12$. FIG. 5 shows examples of window functions (e.g. truncated sinc functions) in both the frequency and time domains that use a Kaiser window for a NR 100 MHz bandwidth signal, with various values for $N_{SUP}$. $N_{SUP}$ is based on values of $\mu=3/8, 1/2, 1/4, 1/8, 1/16$. Each of the window functions shown may be used in examples disclosed herein as a window function to be applied to a symbol to produce a modified symbol for transmission (or further processing such as for example filtering and/or precoding). In the examples shown, using the Kaiser window may provide better ISI free performance against using the Blackman window.

In some examples, filtering or precoding may be applied (e.g. in the frequency domain) to each symbol or modified symbol. The frequency-selective transmission channel can thus effectively be converted to a frequency-flat channel, for example to simplify receiver design. A channel filter may also be used to further decrease out-of-band emission, but may be applied in the time domain. Time domain convolution can be replaced with multiplication in frequency domain if the convolution is cyclic. Joint windowing and filtering (e.g. precoding) can in some examples reduce complexity significantly. An example of this procedure is described below.

1. Denoting a QAM symbol at subcarrier s as $Y_s$, the waveform of OFDM symbol can be given by an IFFT of size $N_{FFT}$, i.e. $y_s=\text{IFFT}(Y_s)$;
2. Repeat $y_s$ two times to get a virtual periodical symbol $y_p$;
3. Multiply with a window function as disclosed herein (e.g. truncated sinc function) $w_1$ to obtain symbol $y_w(n)=w_1(n)*y_p(n)$, for n=0, 1, . . . $2*N_{FFT}-1$, where zeros may be appended to $w_1$ to form $2*N_{FFT}$ length;
4. Use a FFT of size $2*N_{FFT}$ to obtain frequency symbol $Y_w=\text{FFT}(y_w)$ and channel filter $C=\text{FFT}(c)$, where zeros may be appended to c to form $2*N_{FFT}$ length;
5. Perform filtering (e.g. precoding) with $Y=H^*_d*C*Y_w$, where $H_d$ is the frequency response of the channel (e.g. $h_d$), for example at SCS/2 interval bins;
6. Transform Y back to time domain to derive waveform of one modified symbol $y=\text{IFFT}(Y)$, which has a length of $2*N_{FFT}$;
7. Multiple symbols may be overlapped within $N_{FFT}-N_{CP}$, and overlapped parts are summed. Overlapped pats are illustrated in FIG. 3 as vertically aligned portions of adjacent symbols.

Figure 6:
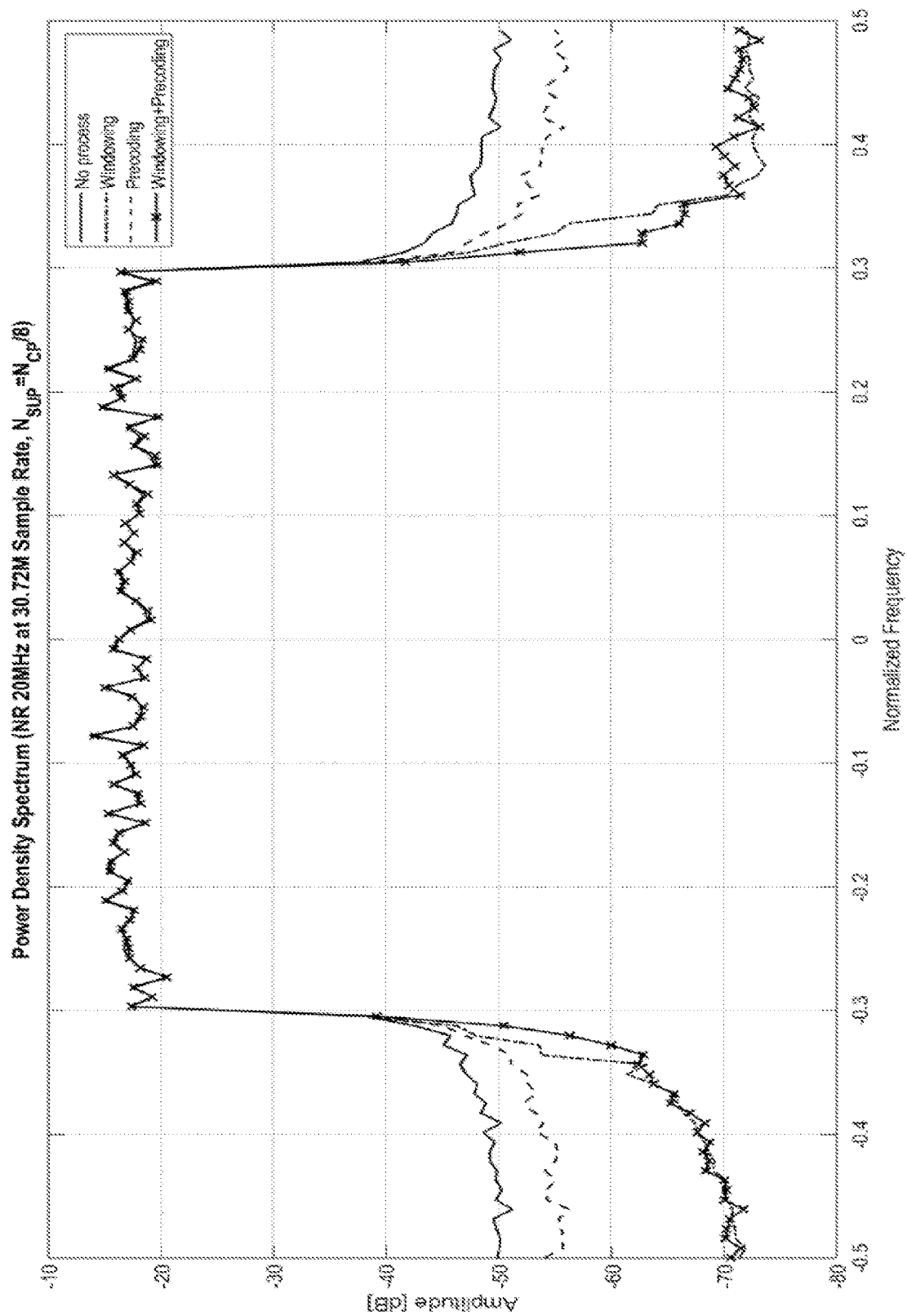
FIG. 6 is a graph illustrating power density spectrums of an example symbol.

FIG. 6 is a graph illustrating power density spectrums of an example symbol following no processing, modification as disclosed herein (e.g. application of a window function), precoding, and both windowing and precoding. This also illustrates a comparison of out-of-band emission between these examples. It can be seen that using windowing (both with and without precoding) shows an improvement to out-of-band emission.

Figure 7:
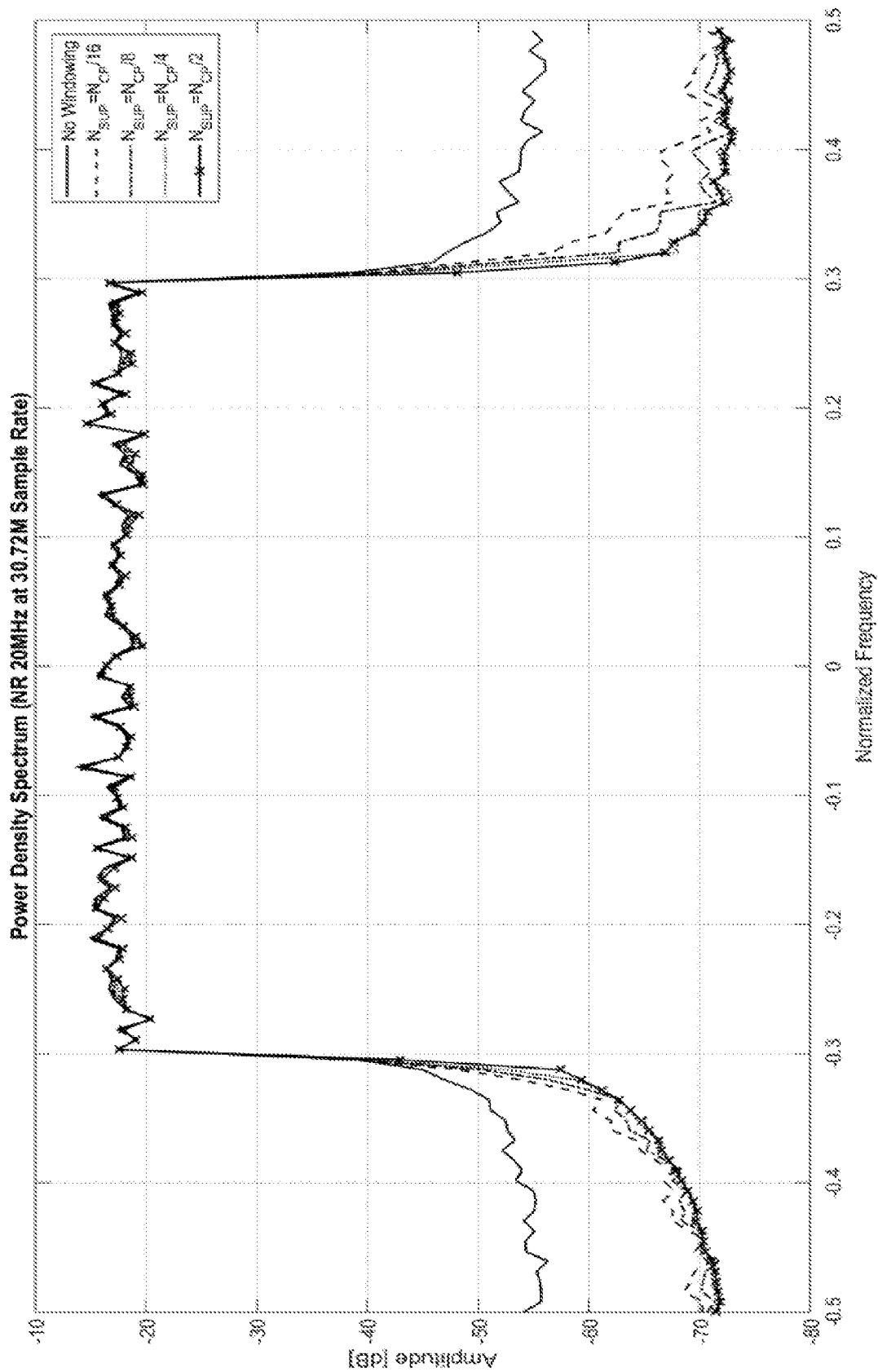
FIG. 7 is a graph illustrating further power density spectrums of an example symbol.
Figure 8:
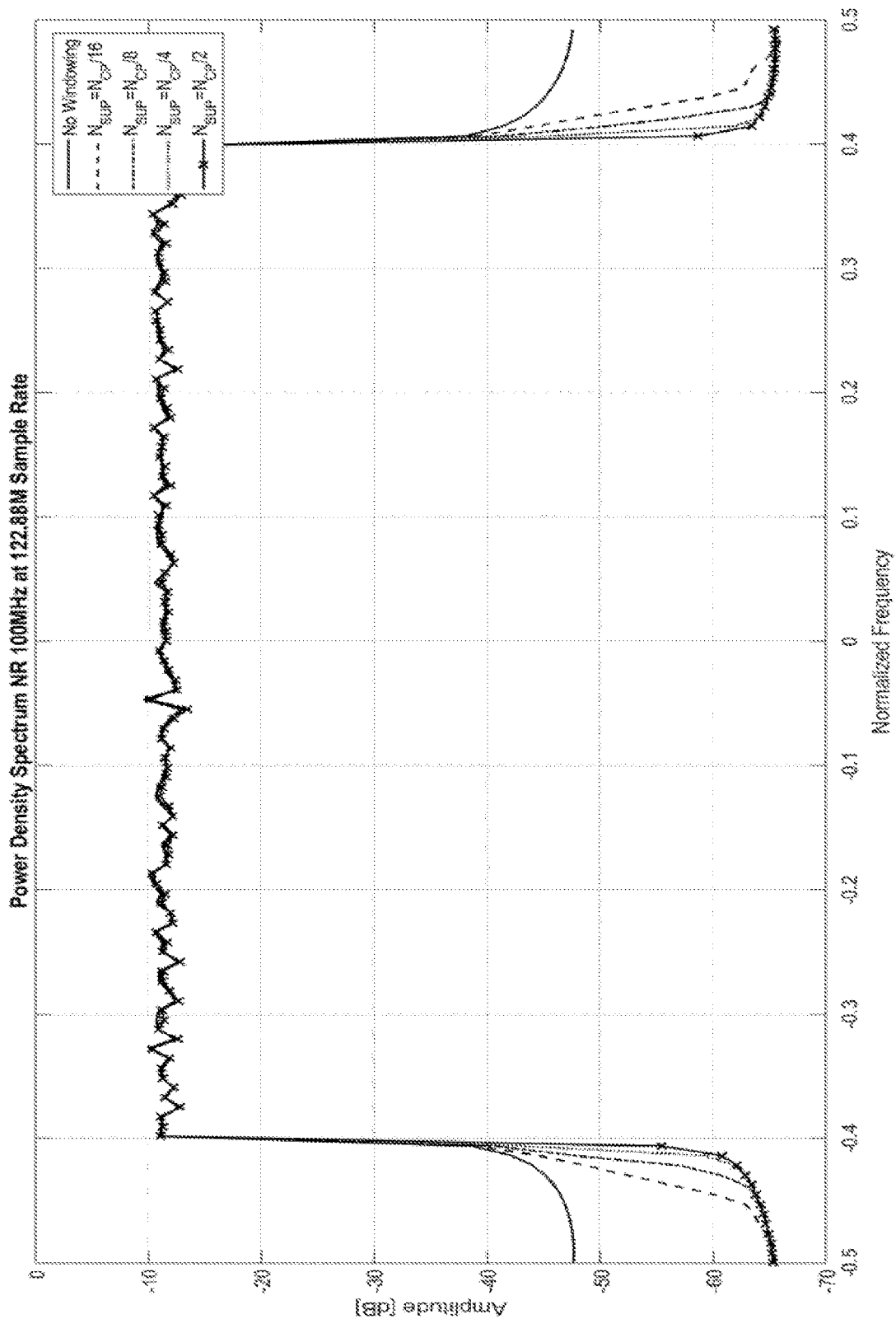
FIG. 8 is a graph illustrating additional power density spectrums of an example symbol.

FIG. 7 is a graph illustrating power density spectrums of an example symbol following no processing, and values for $$N_{SUP} = \frac{N_{CP}}{2}, \frac{N_{CP}}{4}, \frac{N_{CP}}{8}, \frac{N_{CP}}{16}$$

for a NR 20 MHz bandwidth signal. FIG. 8 is a graph illustrating power density spectrums of an example symbol following no processing, and values for $$N_{SUP} = \frac{N_{CP}}{2}, \frac{N_{CP}}{4}, \frac{N_{CP}}{8}, \frac{N_{CP}}{16}$$

for a NR 100 MHz bandwidth signal. A 20 MHz channel filter is applied to the NR 20 MHz signal in FIG. 7. A 100 MHz channel filter is applied to the NR 100 MHz signal in FIG. 8. It can be seen that by using a variable $N_{SUP}$ in some examples, out-of-band emission may be improved, for example by using up-to-date CSIT.

Embodiments disclosed herein may be implemented at or in a base station for downlink transmission, or at or in a UE for uplink transmission. In other words the embodiments may be comprised in a transmitter stage of a wireless communications apparatus. Such stage may be termed generically as a transmitter. In some examples a transmitter is comprised in a transceiver circuit or circuitry. For uplink transmission from multiple UEs to a single base station, for example, each UE may be associated with its respective $N_{SUP}$, which may vary between UEs. In some examples, the process of modifying a symbol may be transparent to a receiver of the modified symbol.

Figure 9:
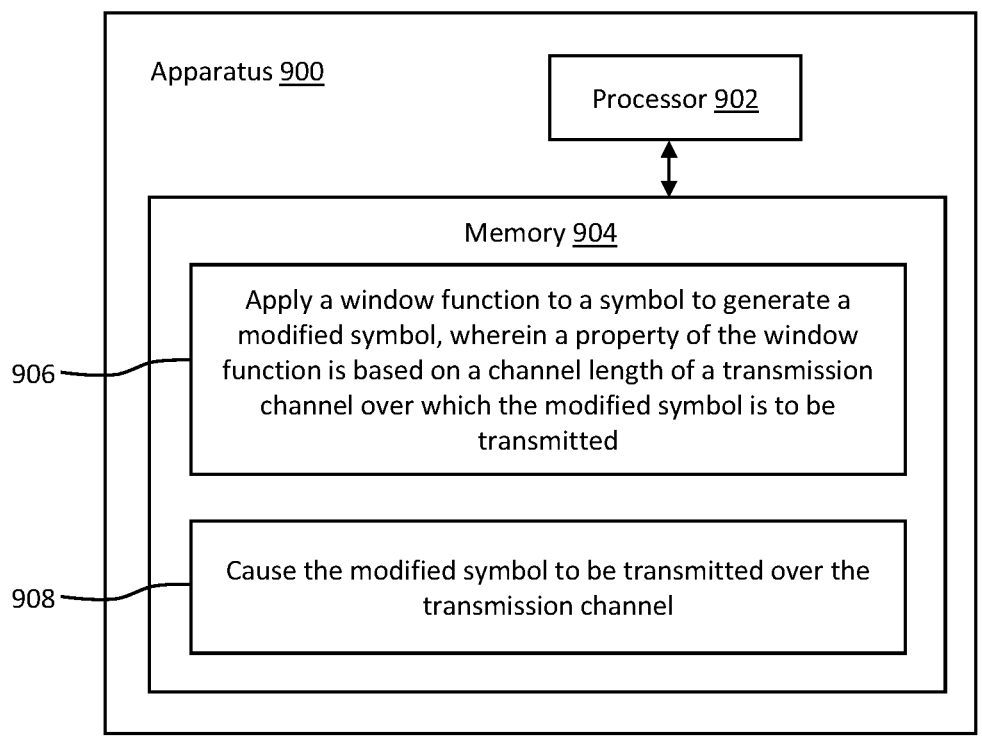
FIG. 9 is a schematic of an example of apparatus for preparing a symbol for transmission.

FIG. 9 is a schematic of an example of an apparatus 900 for preparing a symbol for transmission. The apparatus 900 comprises a processor 902 and a memory 904. The memory 904 contains instructions executable by the processor 902 such that the apparatus 900 is operable to apply 906 a window function to a symbol to generate a modified symbol, wherein a property of the window function is based on a channel length of a transmission channel over which the modified symbol is to be transmitted, and cause 908 the modified symbol to be transmitted over the transmission channel. In some examples, the memory 904 contains instructions executable by the processor 902 such that the apparatus 900 is operable to carry out any of the steps of the method 100 described above.

Figure 10:
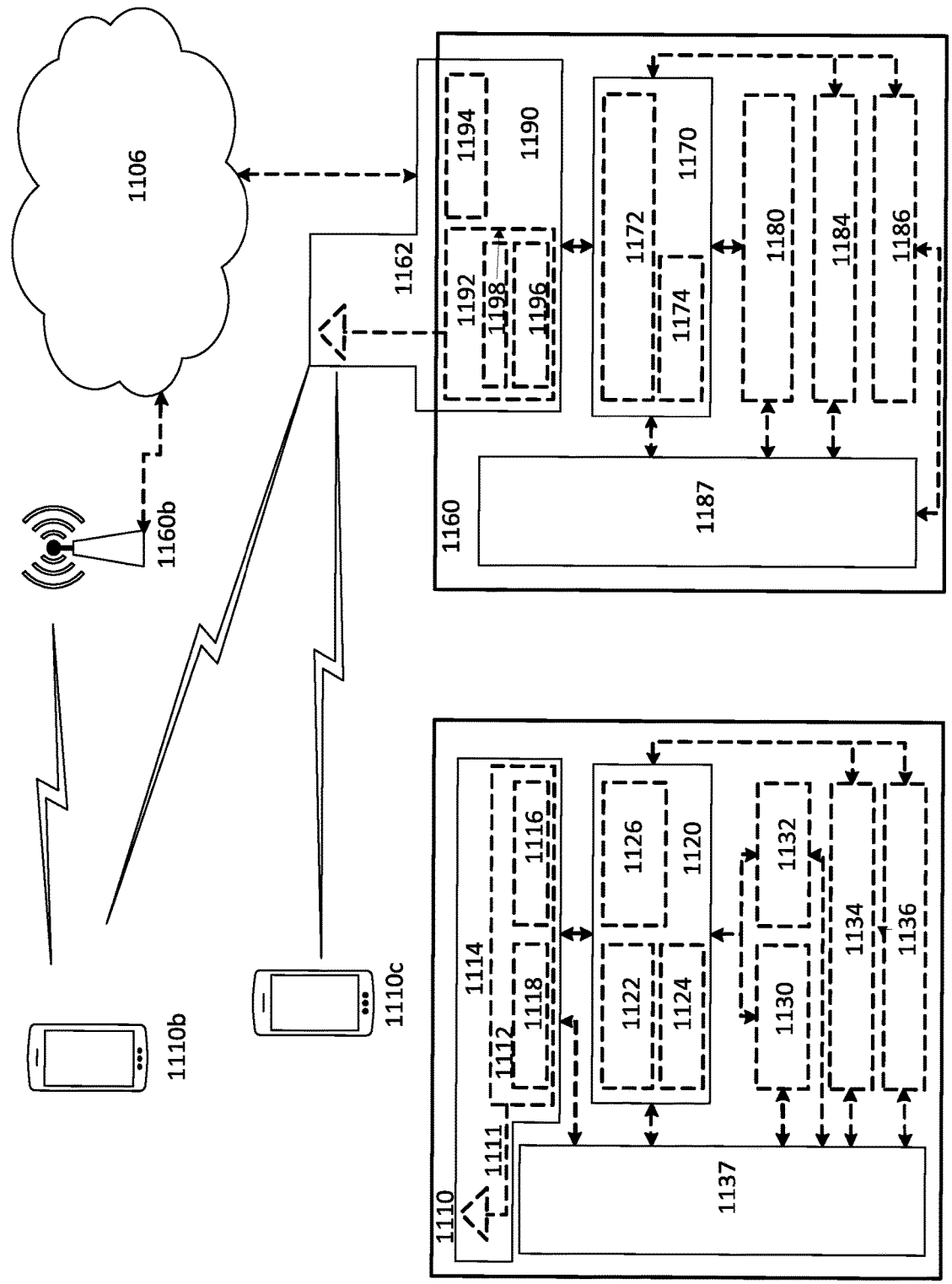
FIG. 10 is an example of a wireless network.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1106, network nodes 1160 and 1160b, and wireless devices 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and wireless device 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or wireless devices 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or wireless devices via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192.

Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 10 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method performed by a wireless transmitter for preparing a symbol for transmission, the method comprising:
　applying a window function to a symbol to generate a modified symbol including a cyclic prefix (CP) having a length $N_{CP}$ and a zero padding (ZP) having a length $N_{SUP}$:
　　a property of the window function being based on a channel length of a transmission channel over which the modified symbol is to be transmitted; and
　　$N_{SUP}=\mu N_{CP}$, wherein $0<\mu<1$, and $\mu$ is a factor based on:
　　　the channel length,
　　　a channel state information at the transmitter (CSIT), or
　　　both the channel length and CSIT; and
　causing the modified symbol to be transmitted over the transmission channel.

2. The method of claim 1, wherein an amount of interference between the modified symbol and a preceding modified symbol and/or a subsequent modified symbol is based on the property of the window function.

3. The method of claim 1, wherein the property of the window function comprises at least one of a bandwidth and roll-off rate of the window function.

4. The method of claim 1, wherein applying the window function to the symbol comprises applying a window function based on a truncating window function and wherein a bandwidth or roll-off rate of the truncating window function is based on the channel length.

5. The method of claim 4, wherein the bandwidth or roll-off rate of the truncating window function is further based on a bandwidth of the transmission channel.

6. The method of claim 4, wherein the truncating window function comprises a Hanning, Blackman or Kaiser window function.

7. The method of claim 4, wherein the window function comprises a rectangular or sinc function combined with the truncating window function.

8. The method of claim 7, wherein the window function comprises the sinc function multiplied with the truncating window function in the frequency domain.

9. The method of claim 7, wherein a size of the rectangular function or a bandwidth of the sinc function is based on the channel length.

10. The method of claim 1, wherein causing the modified symbol to be transmitted comprises applying filtering to the modified symbol based on a channel response of the transmission channel to form a filtered symbol, and causing the filtered symbol to be transmitted.

11. The method of claim 1, wherein a roll-off rate of the window function is higher for a shorter channel length of the transmission channel.

12. The method of claim 1, comprising determining the channel length based on a signal from a node to which the modified symbol is to be transmitted.

13. The method of claim 1, comprising overlapping the modified symbol with a preceding modified symbol and/or a subsequent modified symbol.

14. The method of claim 13, comprising:
applying a preceding window function to a preceding symbol to generate the preceding modified symbol, wherein a property of the preceding window function is based on a channel length of a transmission channel over which the preceding modified symbol is to be transmitted; and/or applying a subsequent window function to a subsequent symbol to generate the subsequent modified symbol, wherein a property of the subsequent window function is based on a channel length of a transmission channel over which the subsequent modified symbol is to be transmitted.

15. The method of claim 1, wherein the symbol comprises an Orthogonal Frequency Division Multiplexed (OFDM) symbol.

16. The method of claim 1, wherein the method is performed by a base station or a User Equipment (UE).

17. An apparatus for preparing a symbol for transmission, the apparatus comprising a processor and a memory, the memory containing instructions executable by the processor such that the apparatus is operable to:
apply a window function to a symbol to generate a modified symbol including a cyclic prefix (CP) having a length $N_{CP}$ and a zero padding (ZP) having a length $N_{SUP}$:
a property of the window function being based on a channel length of a transmission channel over which the modified symbol is to be transmitted; and
$N_{SUP} = \mu N_{CP}$, wherein $0 < \mu < 1$, and $\mu$ is a factor based on:
the channel length,
a channel state information at the transmitter (CSIT), or
both the channel length and CSIT; and
cause the modified symbol to be transmitted over the transmission channel.

18. The apparatus of claim 17, wherein the apparatus comprises a base station or User Equipment (UE).

19. A non-transitory computer-readable medium comprising, stored thereupon, a computer program comprising instructions that, when executed on at least one processor of a transmitter apparatus, cause the at least one processor to:
apply a window function to a symbol to generate a modified symbol including a cyclic prefix (CP) having a length $N_{CP}$ and a zero padding (ZP) having a length $N_{SUP}$:
a property of the window function being based on a channel length of a transmission channel over which the modified symbol is to be transmitted; and
$N_{SUP} = \mu N_{CP}$, wherein $0 < \mu < 1$, and $\mu$ is a factor based on:
the channel length,
a channel state information at the transmitter (CSIT), or
both the channel length and CSIT; and
cause the modified symbol to be transmitted over the transmission channel.

* * * * *